F. A. MORRISON.
GLASSES.
APPLICATION FILED JULY 14, 1914. RENEWED NOV. 11, 1915.
1,187,644.                                                     Patented June 20, 1916.
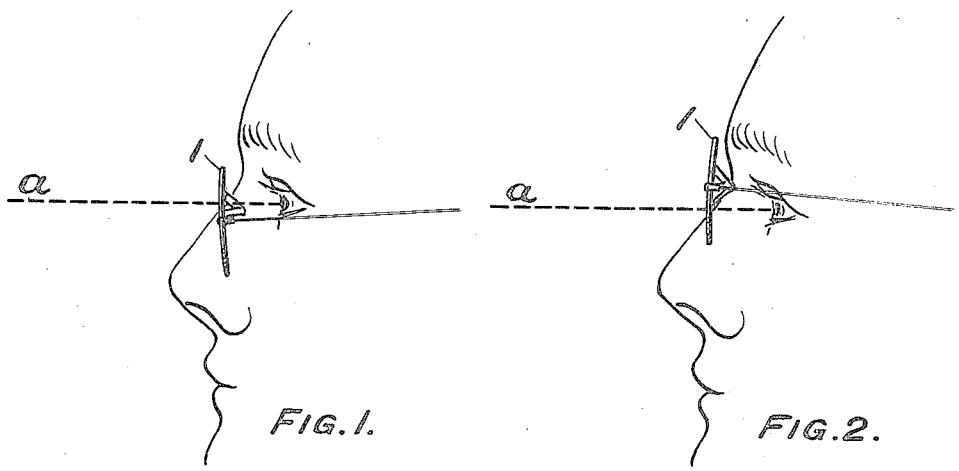
FIG.1.     FIG.2.
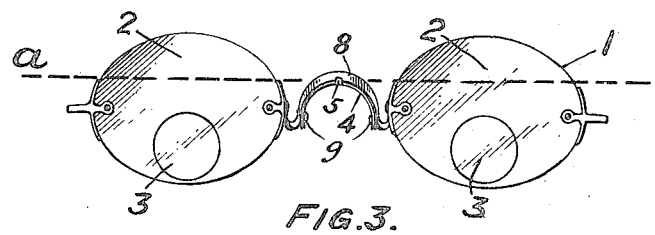
FIG.3.
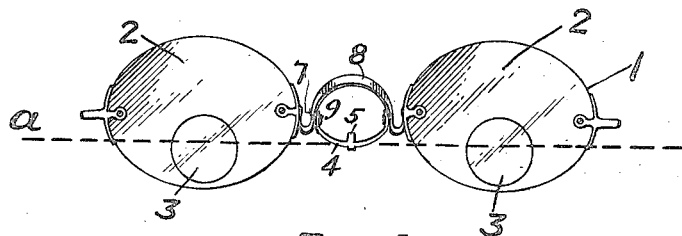
FIG.4.
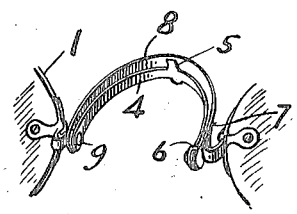   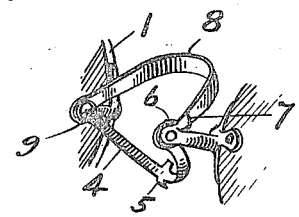
FIG.5.     FIG.6.
WITNESSES:                                                     INVENTOR
Rob't R Kitchel                                                Francis A. Morrison
Frank E Funch                                              BY  Augustus B Stoughton
                                                                   ATTORNEY.

UNITED STATES PATENT OFFICE.

FRANCIS A. MORRISON, OF PHILADELPHIA, PENNSYLVANIA.

GLASSES.

1,187,644.  Specification of Letters Patent.  Patented June 20, 1916.

Application filed July 14, 1914, Serial No. 850,847. Renewed November 11, 1915. Serial No. 60,992.

*To all whom it may concern:*

Be it known that I, FRANCIS A. MORRISON, a citizen of the United States, and a resident of Philadelphia, in the county of Philadelphia and State of Pennsylvania, have invented certain new and useful Improvements in Glasses, of which the following is a specification.

The principal object of the present invention is to improve bifocal glasses in such a way that they can be easily and quickly adjusted by the user into either near or distance position, without necessitating in all cases the removal of the glasses, although of course they can be removed if desired.

The invention comprises the improvements to be presently described and finally claimed.

For the sake of description I have selected one embodiment of the invention and have illustrated it in the accompanying drawings, in which—

Figures 1 and 2 are diagrammatic views illustrating two positions of the bifocal lenses in respect to the eyes of the wearer. Figs. 3 and 4, are front views of the glasses, drawn to an enlarged scale and showing two positions of the parts, and Figs. 5 and 6 are perspective views looking from the back of the glasses.

In the drawings 1 are bifocal lenses of which the portions 2 are for distance vision and the portions 3 are for near vision. Such bifocal lenses are well understood and can be variously constructed in one or more than one piece.

4, is a movable nose rest and there are automatic means comprising, as shown in the drawings, the clip 5, the stop 6 and the spring 7 for positioning the movable nose rest. The clip 5, consists, as shown, of a forward upward extension and a rearward extension. The forward extension by reason of its upward curve constitutes a convenient finger piece as well as a stop and the rearward extension operates as a retaining spring or detent spring.

The invention is illustrated for the sake of description in application to spectacles and 8 is the bridge piece which connects the lenses. The nose rest 4 is shown as pivotally connected at 9 with the bridge 8 and the spiral spring 7 is interposed between the bridge 8 and the nose rest 4 and tends to position the latter as shown in Fig. 6. The stop 6 limits the action of the spring and so insures the positioning of the movable nose rest. The clip 5 coöperates with the bridge piece 8 and holds the movable element 4 in alinement with the bridge 8.

For the sake of a description of the invention it may be assumed that the dotted line *a* represents the line of vision. If the wearer desires to use the distance portion of the lenses he moves the nose rest up so that the automatic holding means 5 coöperate with the support and positions the distance portion of the lenses 2 in the line of vision *a*. Of course the line of vision *a* is an arbitrary or diagrammatic suggestion and is used only for the sake of description. If the wearer desires to use the near portion of the lenses 3, he releases the movable nose rest so that the automatic holding means 6 and 7 coöperate with the rest 4 and so position the glasses with the portion 3 in the line *a*. The change from one position to the other, that is from the position shown in Figs. 1, 3, and 5, to the position shown in Figs. 2, 4 and 6 can be made without removing the glasses, which is a matter of convenience. Furthermore the glasses are sightly and the fact that the wearer can readily position them for near and distance vision is a matter of great importance, for in many cases the eye cannot accommodate itself quickly and properly to vision through both portions of the bifocal glasses.

It may be said that by the present invention one pair of glasses is made to do the work of two and it performs the work of each of the two properly and with comfort and ease to the wearer.

While I have described one embodiment of the invention, I do not intend to limit myself to that embodiment because the invention is capable of other embodiments and is not limited in matters of detail and construction, or in any way further than the prior state of the art and the appended claims may require.

What I claim is:

Glasses comprising the combination of bifocal lenses, a bridge piece which connects the lenses, a nose rest conforming to the bridge piece and pivotally connected near its ends to the bridge piece to permit it to be alined therewith and to be turned away therefrom, and a spring device for holding the nose rest in one position, and means for holding the nose rest in the other position, substantially as described.

In testimony whereof I have hereunto signed my name.

FRANCIS A. MORRISON.

Witnesses:
FRANK E. FRENCH,
CLIFFORD K. CASSEL.